United States Patent
Kuo et al.

(10) Patent No.: US 8,424,627 B2
(45) Date of Patent: Apr. 23, 2013

(54) WHEEL MODULE AND WHEELCHAIR USING THE SAME

(75) Inventors: Chung-Hsien Kuo, New Taipei (TW); Wei-Chen Lee, Taipei (TW); Jyun-An Yao, Pingtung County (TW); Yan-Cheng Wang, Kaohsiung (TW)

(73) Assignee: National Taiwan University of Science and Technology, Taipei (TW)

( * ) Notice: Subject to any disclaimer, the term of this patent is extended or adjusted under 35 U.S.C. 154(b) by 28 days.

(21) Appl. No.: 13/198,724

(22) Filed: Aug. 5, 2011

(65) Prior Publication Data

US 2012/0312623 A1    Dec. 13, 2012

(30) Foreign Application Priority Data

Jun. 13, 2011   (TW) .................. 100120571

(51) Int. Cl.
- *B60K 17/30* (2006.01)
- *B60K 17/04* (2006.01)
- *A61G 5/04* (2006.01)
- *B60K 1/02* (2006.01)

(52) U.S. Cl.
USPC .......... 180/253; 180/373; 180/371; 180/65.1; 180/907

(58) Field of Classification Search ............. 180/252, 180/253, 254, 255, 260, 261, 262, 263, 264, 180/265, 266, 267, 13, 12, 373, 371, 65.1, 180/907
See application file for complete search history.

(56) References Cited

U.S. PATENT DOCUMENTS

| | | | | |
|---|---|---|---|---|
| 2,384,059 A * | 9/1945 | Wolf | ............ | 180/53.1 |
| 3,833,078 A * | 9/1974 | Chaney et al. | ............ | 180/255 |
| 4,657,104 A * | 4/1987 | Holland | ............ | 180/211 |
| 4,683,973 A * | 8/1987 | Honjo et al. | ............ | 180/252 |
| 5,690,185 A * | 11/1997 | Sengel | ............ | 180/65.1 |
| 6,138,785 A * | 10/2000 | Satoh et al. | ............ | 180/305 |
| 6,145,611 A * | 11/2000 | Haddad, Sr. | ............ | 180/12 |
| 2001/0008985 A1* | 7/2001 | Wada | ............ | 701/1 |
| 2007/0175678 A1* | 8/2007 | Bae | ............ | 180/65.1 |

FOREIGN PATENT DOCUMENTS

| JP | 60078831 A | * | 5/1985 |
|---|---|---|---|
| JP | 60252025 A | * | 12/1985 |
| JP | 62061879 A | * | 3/1987 |
| JP | 62091318 A | * | 4/1987 |
| JP | 62128832 A | * | 6/1987 |
| JP | 62173323 A | * | 7/1987 |

* cited by examiner

*Primary Examiner* — Faye M Fleming
*Assistant Examiner* — Keith Frisby
(74) *Attorney, Agent, or Firm* — Jianq Chyun IP Office

(57) ABSTRACT

A wheelchair including a seat body and at least one wheel module disposed at a bottom of the seat body is provided. The wheel module includes a motor, at least one wheel, and a transmission unit coupled between the motor and the wheel. The transmission unit has at least one one-way bearing. The motor outputs a first rotating moment and a second rotating moment with opposite directions to the transmission unit. The one-way bearing transmits one of the first rotating moment and the second rotating moment to the wheel to drive the wheel to roll, such that the seat body is in linear motion, or so the wheel module rotates relative to the seat body in the directions of the first or the second rotating moments. The shafts of the first and the second rotating moments are perpendicular to the rotating shaft of the wheel.

11 Claims, 12 Drawing Sheets

(12) United States Patent

WHEEL MODULE AND WHEELCHAIR USING THE SAME

CROSS-REFERENCE TO RELATED APPLICATION

This application claims the priority benefit of Taiwan application serial no. 100120571, filed Jun. 13, 2011. The entirety of the above-mentioned patent application is hereby incorporated by reference herein and made a part of this specification.

BACKGROUND OF THE INVENTION

1. Field of the Invention

The invention relates to a wheel module and particularly to a wheel module applied to a wheelchair.

2. Description of Related Art

Nowadays, because of age and injuries, many handicapped people use wheelchairs as a mobility device. In home environments, many times space is limited so it is difficult for a wheelchair to enter and exit, causing inconvenience in mobility.

In order to improve the mobility in narrow spaces, wheelchairs have adopted a method of driving with a motor for the left and right wheels. Even though this method allows the wheelchair to rotate in place, the wheelchair can not move sideways. For example, if a kitchen counter and a oven top are located on the same side in a kitchen, when the wheelchair user wants to move from the kitchen counter to the oven top, he or she must first move back, turn, move towards the oven top, and then turn to face the oven top. The movement is very inconvenient, and so sideways movement in a wheelchair is very important for a user.

FIG. 9 shows a bottom view of a conventional wheelchair. The four wheel modules 500 of the wheelchair 20 are all used with omni-wheel, and each wheel module 500 is driven by an independent motor 600. In addition, since a roller 510 and a wheel shaft 520 around the wheel frame of the wheelchair 20 form a 45 degree angle, not only can the wheelchair 20 rotate in place, but it can also move in parallel from left to right. Even though the design improves the mobility of wheelchairs in narrow spaces, however, the design relies on a wheel shaft 520 and a roller 510 for rotation, respectively generating two different velocity vector components with different directions. Thus, the two different velocity directions mutually offset to control movement direction, thus causing a portion of power outputted by the motor 600 being neutralized. This causes slow movement velocity and consumes unnecessary electric power.

SUMMARY OF THE INVENTION

The invention relates to a wheel module, wherein the wheel module achieves linear motion or rotation through a clutch effect of one-way bearings.

The invention further provides a wheelchair that can move linearly or sideways by way of the wheel module.

An embodiment of the invention is directed to a wheel module, including a motor, at least one wheel, and a transmission unit coupled between the wheel and the motor. The transmission unit includes at least one one-way bearing. The motor outputs a first rotating moment and a second rotating moment with opposite directions to the transmission unit. The one-way bearing transmits one of the first rotating moment and the second rotating moment to the wheel, driving the wheel to roll, so that the wheel module is in linear motion, or so the wheel module rotates in the directions of the first or the second rotating moments. One of the shafts of the first and the second rotating moments is perpendicular to a rotating shaft of the wheel.

Based on the above, in the embodiment of the invention, one-way bearings can be disposed in the wheel module to respectively control the rotating direction of the wheel, and cause the wheel module to simultaneously possess two degrees of freedom in forward motion and rotation with only a single motor. Through the harmony and coordination of the rotation angle between wheels, the wheelchair, through the wheel module, drives the seat body to create different modes of motion such as linear motion or left, right sideways motion. This allows the wheel module of the invention to effectively improve the rotating efficiency of the wheel. That is to say, the wheel does not need velocity components of multiple directions to move. This way, the power transformation and movement of the wheelchair has a better practical efficiency.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
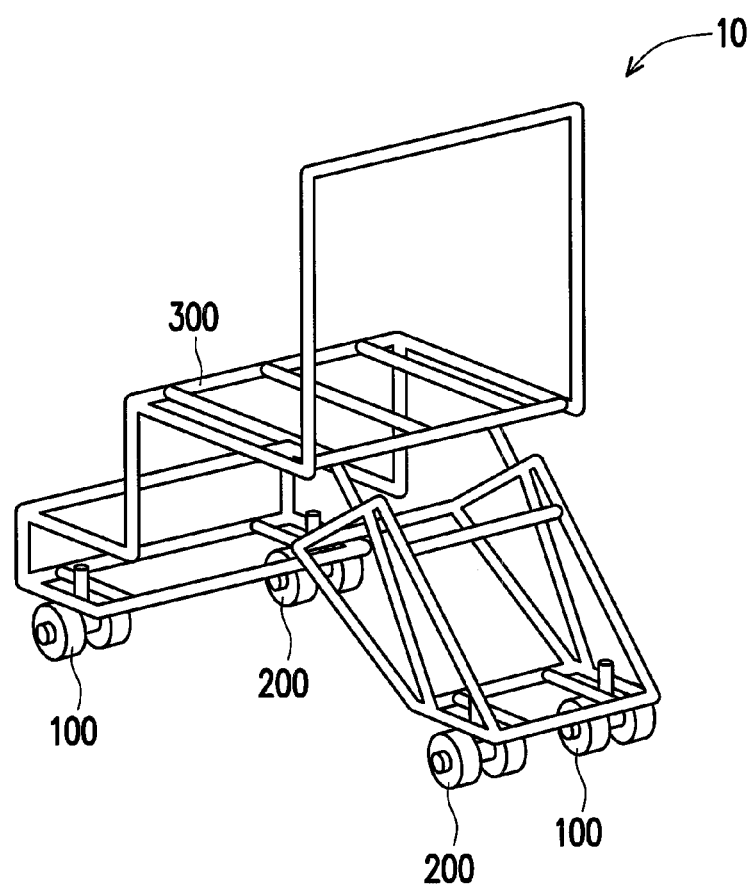
FIG. 1 is a schematic view of a wheelchair according to an embodiment of the invention.
Figure 2A:
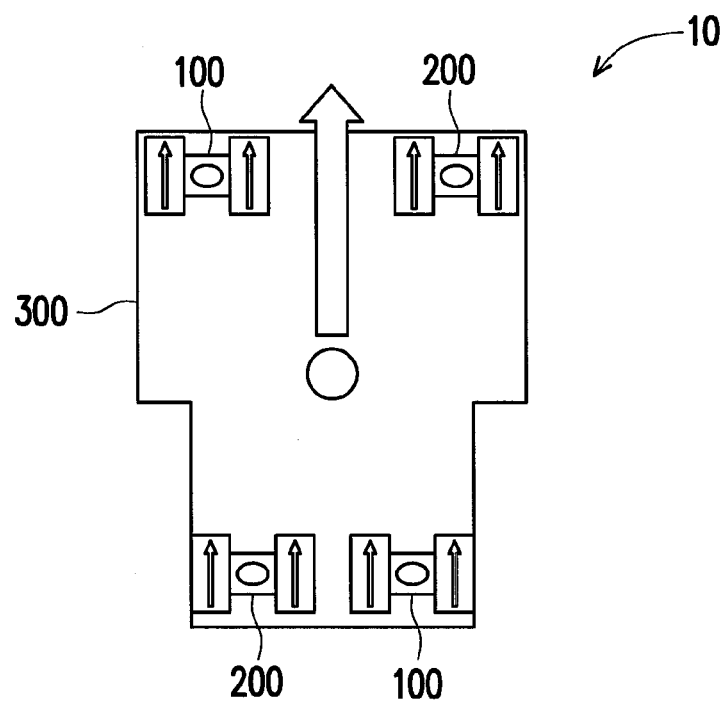
FIG. 2A and FIG. 2B are respectively bottom views of the wheelchair of FIG. 1.
Figure 2B:
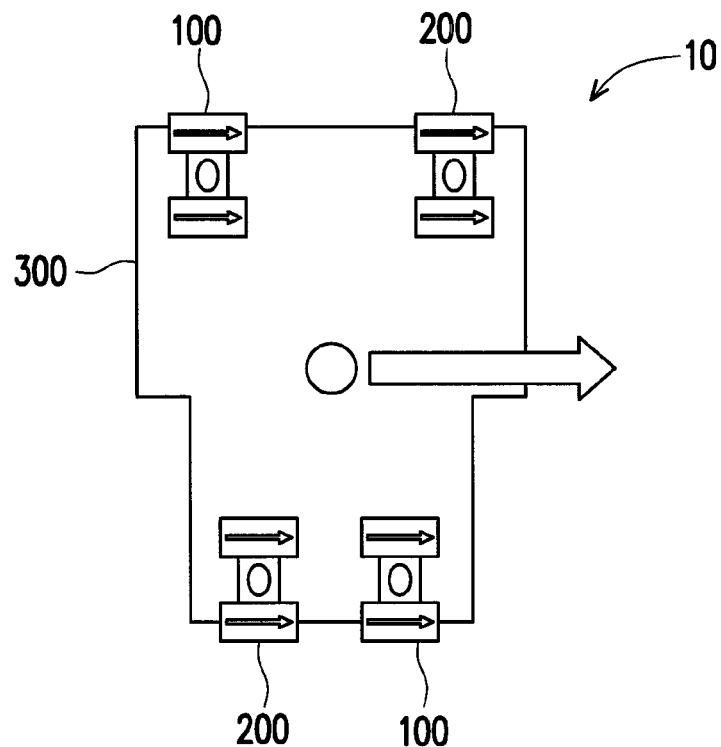

FIG. 1 is a schematic view of a wheelchair according to an embodiment of the invention. FIG. 2A and FIG. 2B are respectively bottom views of the wheelchair of FIG. 1, and respectively show the relation between the seat body and the wheel module when the wheelchair is in linear motion or in sideways motion. Referring to FIG. 1, FIG. 2A, and FIG. 2B, in the embodiment, the wheelchair 10 includes a plurality of wheel modules 100, a plurality of passive wheels 200, and a seat body 300. The wheel modules 100 and the passive wheels 200 are disposed below the seat body 300, and the wheel modules 100 pull the passive wheels 200 to rotate, achieving linear motion or sideways motion for the seat body 300. It should be noted that the invention does not limit the amount of the wheel module 100 and the passive wheel 200, and does not limit the position of the wheel module 100 and the passive wheel 200 relative the seat body 300. The design of the wheelchair 10 can change according to the required load and use. Accordingly, the following is a description of one of the wheel modules 100.

Figure 3A:
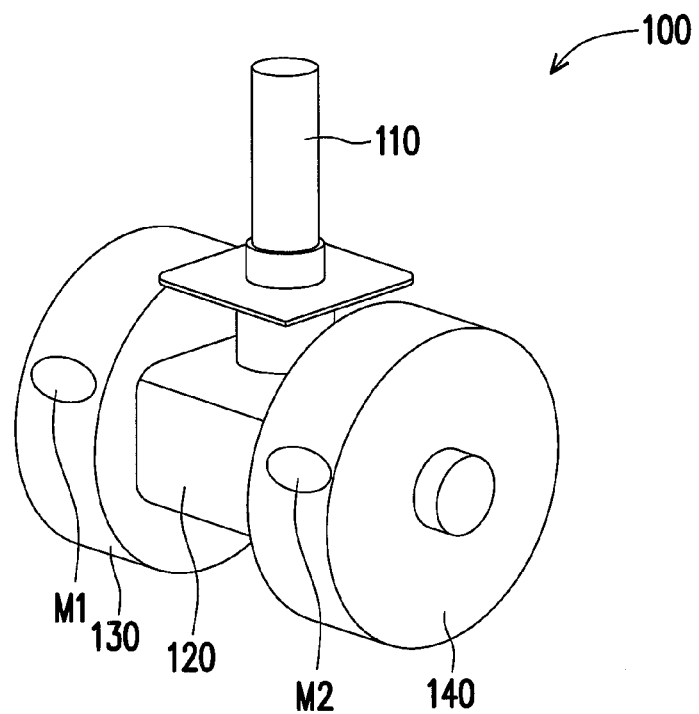
FIGS. 3A and 3B respectively show the wheel module of FIG. 1 under different conditions.
Figure 3B:
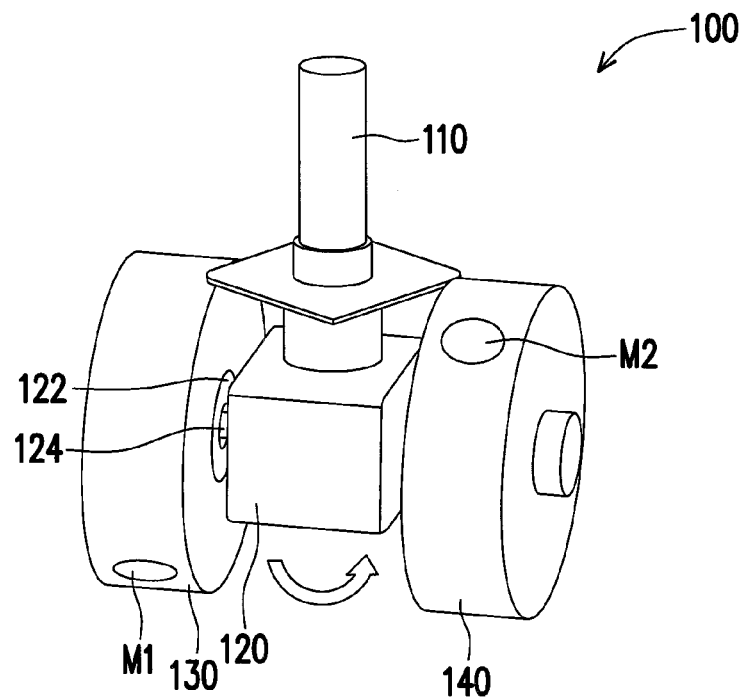
Figure 4A:
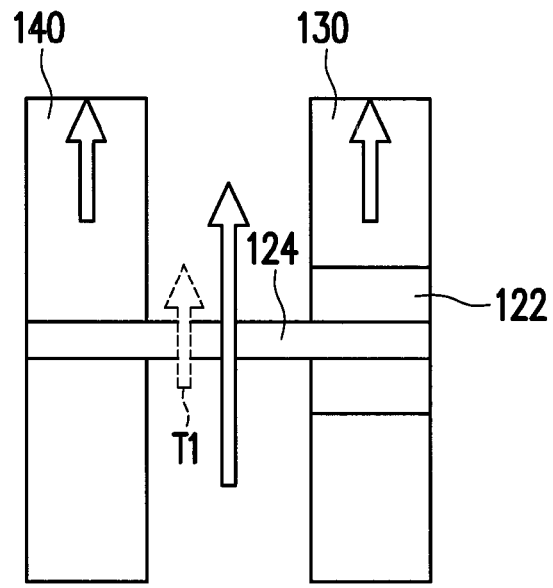
FIG. 4A and FIG. 4B are respectively top views of a center plane cross section of the wheel of the wheel module.
Figure 4B:
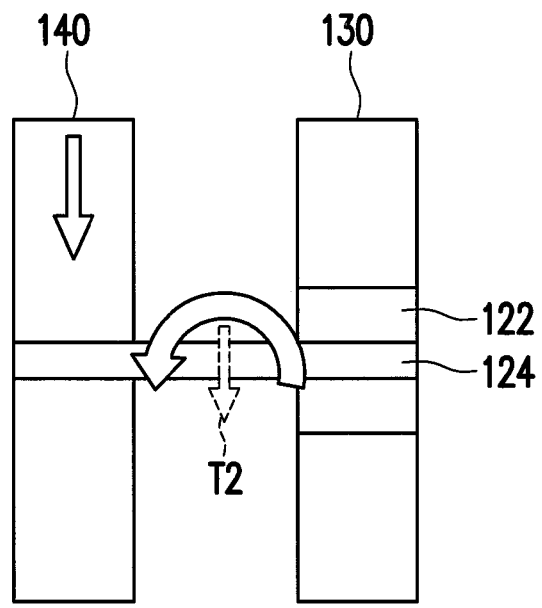

FIGS. 3A and 3B respectively show the wheel module of FIG. 1 under different conditions. FIG. 4A and FIG. 4B are respectively top views of the center plane cross section of the wheel of the wheel module. Referring to FIG. 3A, FIG. 3B, FIG. 4A, and FIG. 4B, in the embodiment, the wheel module 100 includes a motor 110, a transmission unit 120, a first wheel 130, and a second wheel 140. The transmission unit 120 is coupled to the motor 110. The first wheel 130 and the second wheel 140 are respectively coupled to the two opposite sides of the transmission unit 120.

Further, the transmission unit 120 includes a one-way bearing 122 and a transmission shaft 124. The first wheel 130 and the second wheel 140 are respectively coaxially coupled to the two opposite sides of the transmission shaft 124. The one-way bearing 122 is coupled between the first wheel 130 and the transmission shaft 124. Accordingly, by way of the one-way bearing 122, the first wheel 130 only receives the rotating moment with single direction transmitted by the transmission shaft 124. This causes the wheels 130 and 140 to have a velocity difference, so the wheel module 100 can rotate relative to the seat body 300. The solid arrows herein represent the tangent direction of the wheels 130 and 140 and the direction of movement of the wheel module 100 when the wheels 130 and 140 rotate, and the dashed arrows herein represent the tangent direction of the transmission shaft 124 when the transmission shaft 124 rotates.

For example, when the transmission unit 120 transmits a first rotating moment T1, the transmission unit 120 will drive the first wheel 130 and the second wheel 140 to mutually rotate in the same direction, thus generating linear motion in the wheel module 100 (shown in FIG. 4A). Next, please refer to FIG. 4B, FIG. 3A, and FIG. 3B. In FIG. 3A and FIG. 3B, the first wheel 130 and the second wheel 140 show the references M1 and M2, to clearly show the rotating and drawing relationship between the wheels 130 and 140. When the transmission unit 120 transmits a second rotating moment T2 opposite to the first rotating moment T1, the one-way bearing 122 will loosen the connecting relationship between the first wheel 130 and the transmission shaft 124, so the first wheel 130 can freely rotate, allowing the transmission shaft 124 to only drive the second wheel 140 to rotate. Thus, when there is a difference in velocity between the first wheel 130 and the second wheel 140, the second wheel 140 draws the first wheel 130 to rotate, so the two have an opposite direction of rotation. This allows the wheel module 100 to spin in place relative to the seat body 300. As such, the wheel module 100 changes from the condition shown in FIG. 2A to the condition shown in FIG. 2B. Next, if the transmission unit 120 drives the first wheel 130 and the second wheel 140 to rotate along the direction of the first rotating moment T1, the wheel module 100 is under the condition of linear motion once again, so the seat body 300 has the sideways motion effect as shown in FIG. 2B.

Figure 5:
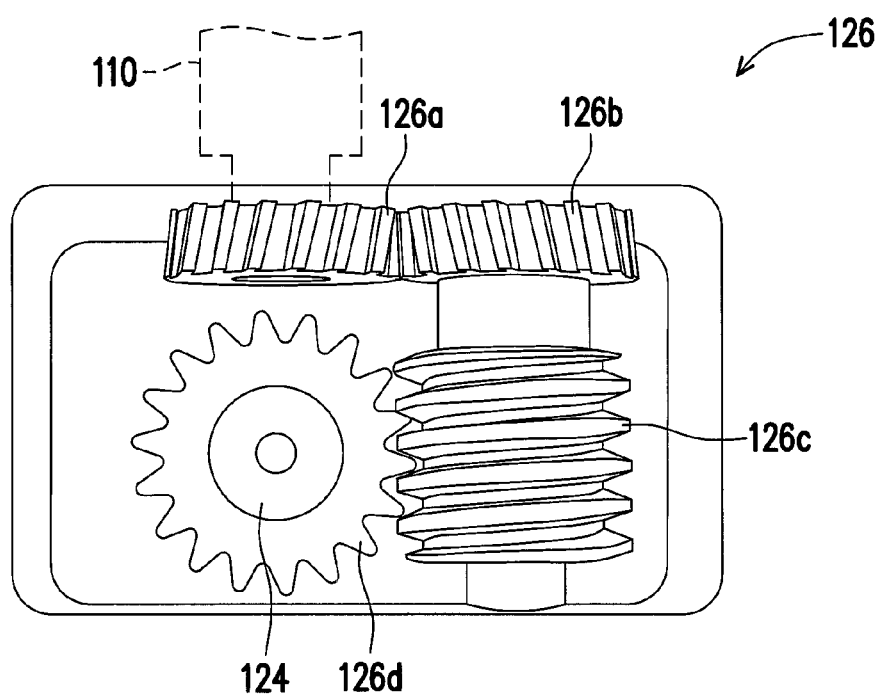
FIG. 5 is a partially enlarged diagram of the transmission unit of FIG. 3A and FIG. 3B.

FIG. 5 is a partially enlarged diagram of the transmission unit of FIG. 3A and FIG. 3B. Referring the FIG. 3A, FIG. 3B, and FIG. 5, the transmission unit 120 further includes a gear set 126, coupled between the motor 110 and the transmission shaft 124. In the embodiment, the gear set 126 is composed of a spur gear set 126a and 126b (preferably a helical spur gear group), a worm shaft 126c, and a worm gear 126d. The worm gear 126d is coaxially disposed on the transmission shaft 124, the spur gear set 126a and 126b are respectively disposed on an end of the motor 110 and an end of the worm shaft 126c, and the other end of the worm shaft 126c is coupled to the worm gear 126d. Since the reduction ratio of the motor 110 itself is inadequate to drive the entire wheelchair 10, therefore a worm gear with a larger reduction ratio and smaller dimensions is used to raise torque. This way not only can the volume of the transmission unit 120 be reduced, but the loading of the wheelchair 10 is increased, and the power of the motor 110 is transmitted to the transmission shaft 124 perpendicular thereto, driving the wheels 130 and 140. In addition, since the axial rotation of the motor 110 will pass through the center of the worm gear 126d, and the axial rotation direction of the wheel module 100 relative to the seat body 300 is also coaxial with the axial rotation of the motor 110, therefore, the goal of power transmission is achieved through the spur gear group 126a and 126b. The rotating shaft of the motor 110 and the wheel module 100 herein are both located in relative coaxial positions, and are perpendicular to the transmission shaft 124 of the wheel module 100. Thus, under the premise of maintaining suitable power output, the volume of the transmission unit 120 can also be effectively reduced.

Figure 6A:
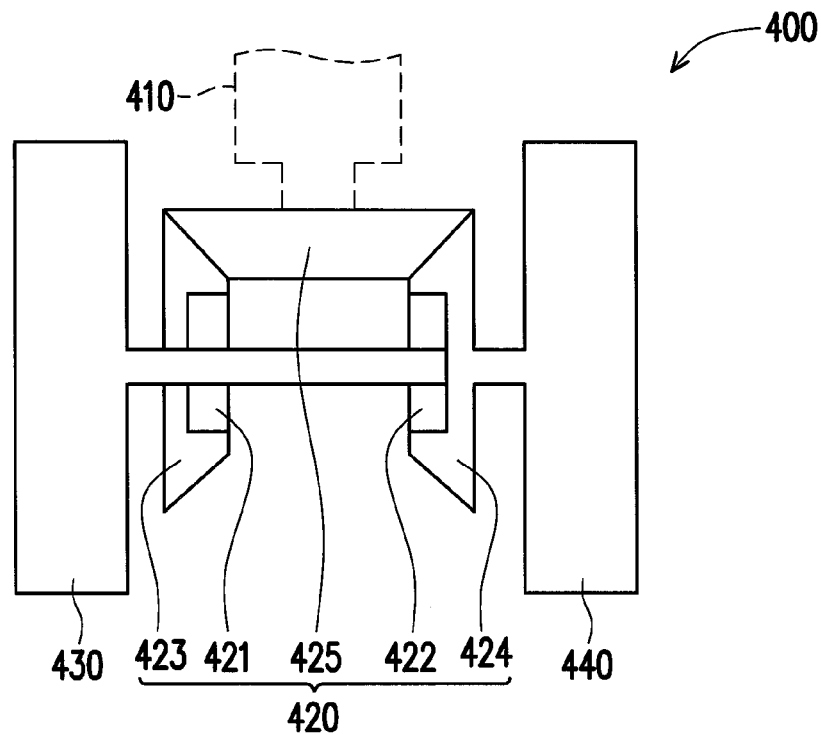
FIG. 6A is a schematic cross sectional view of a wheel module of a wheelchair in another embodiment of the invention.
Figure 6B:
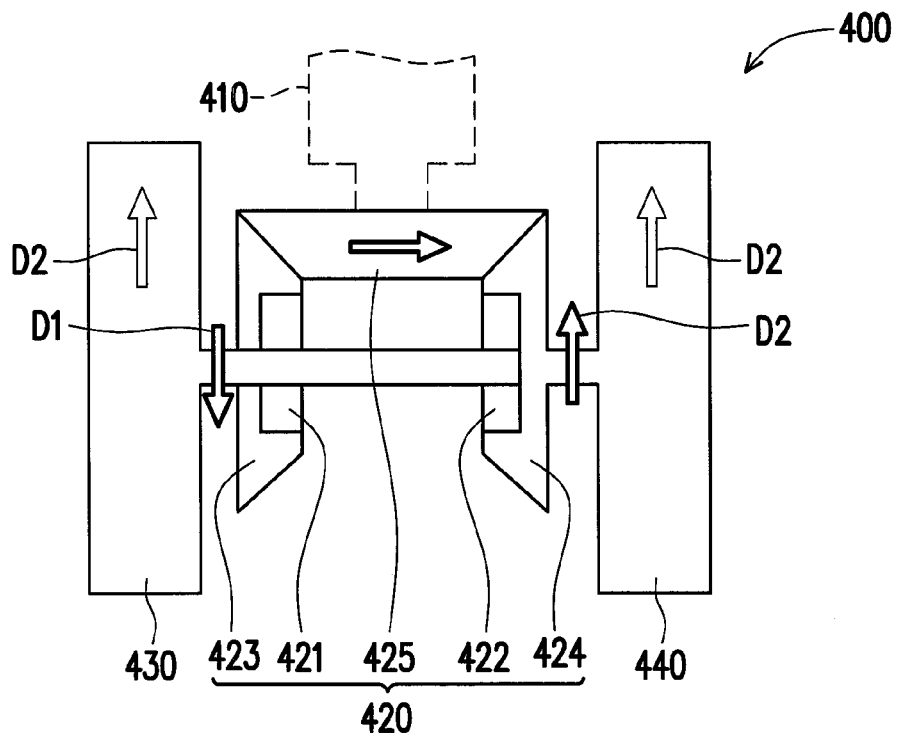
FIGS. 6B and 6C respectively show the wheel module of FIG. 6A under different conditions.
Figure 6C:
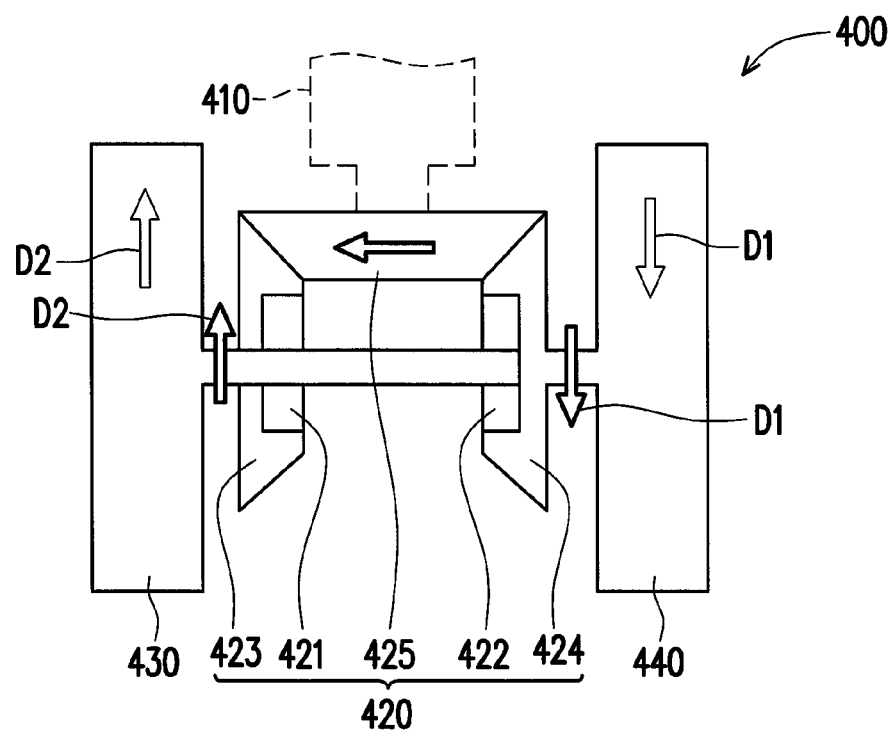

FIG. 6A is a schematic cross sectional view of a wheel module of a wheelchair in another embodiment of the invention. FIGS. 6B and 6C respectively show the wheel module of FIG. 6A under different conditions. Please refer to FIG. 6A through FIG. 6C. The difference between the embodiment and the aforementioned embodiment is in a wheel module 400, the transmission unit 420 includes a first one-way bearing 421, a second one-way bearing 422, a first gear 423, a second gear 424, and a third gear 425. The first gear 423, the second gear 424, and the third gear 425 are bevel gears. The third gear 425 is coupled between the first gear 423 and the second gear 424. A motor 410 is connected to the third gear 425, so that the motor 410 drives the third gear 425, and the third gear 425 drives the first gear 423 and the second gear 424 to rotate in opposite directions. The solid bold arrows herein represent the tangent direction of the first and the second gears 423 and 424 when they rotate, and the solid thin arrows represent the tangent direction of the wheels 430 and 440 when they rotate.

In detail, the first one-way bearing 421 and the first gear 423 are coaxially assembled, and the first wheel 430 is coupled to the first one-way bearing 421. The second one-way bearing 422 and the second gear 424 are coaxially assembled, and the first wheel 430 is also coupled to the second one-way bearing 422. The second wheel 440 is coaxially connected to the second gear 424. In a single motion condition (e.g. the linear motion condition in FIG. 6B or the rotating condition in FIG. 6C), the driving motion of the first one-way bearing 421 and the second one-way bearing 422 are opposite to each other. In other words, through the arrangement of the first one-way bearing 421 and the second one-way bearing 422, only one of the first gear 423 and the second gear 424 at one time is used to drive the first wheel 430 to rotate. The direction the first gear 423 uses to drive the rotation of the first wheel 430 is opposite to the direction the second gear 424 uses to drive rotation of the first wheel 430.

For example, please refer to FIG. 6B. When the motor 410 drives the third gear 425 so the first gear 423 rotates in a first direction D1 and the second wheel 424 rotates in a second direction D2, at this time the first one-way bearing 421 will loosen the connecting condition with the first gear 423, so that only the second gear 424 drives the first wheel 430 to rotate in the second direction D2 by way of the second one-way bearing 422. Furthermore, the second wheel 440 located on the other side of the transmission unit 420 will similarly rotate in the second direction D2 with the second gear 424. Thus, the first wheel 430 and the second wheel 440 rotate in the second direction D2, so that the wheel module 400 is in linear motion.

Please refer to FIG. 6C. When the first gear 423 rotates in the second direction D2 (i.e. the second gear 424 rotates in the first direction D1), at this time the second gear 424 will loosen the connecting relationship with the first wheel 430, so that only the first gear 423 drives the first wheel 430 to rotate in the second direction D2 by way of the first one-way bearing 421. The second wheel 440 located on the other side of the transmission unit 420 will maintain rotating in the first direction D1 with the second gear 424. Thus, the first wheel 430 and the second wheel 440 rotate in opposite directions, causing the wheel module 400 to have a turning effect. This way regardless of whether the wheel module 400 is in linear motion or in rotating motion, both motions effectively obtain power from the motor 410, so the wheels 430 and 440 can make definite contact with the surface, improving the advancement efficiency of the wheel module 400.

In addition, to achieve the lightweight effect of the transmission unit 120 of the previous embodiment, in the embodiment, the axial rotation of the motor 410 similarly passes through the center of the third gear 425 (i.e. the axial rotation of the motor 410 passes through the axial transmission of the wheels 430 and 440), and the axial rotation of the wheel module 400 and the axial rotation of the motor 410 are coaxial. Thus, the transmission unit 420 of the embodiment has a smaller volume similar to that of the previous embodiment.

Figure 7A:
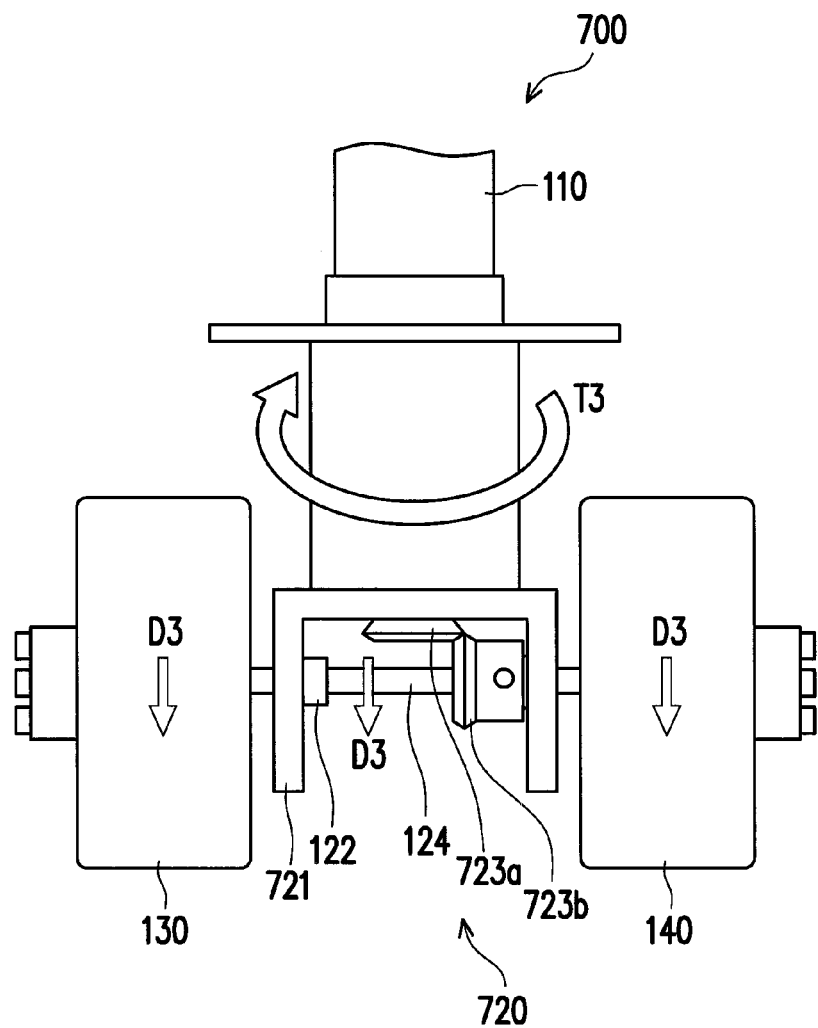
FIGS. 7A and 7B respectively show the wheel module of yet another embodiment under different conditions.
Figure 7B:
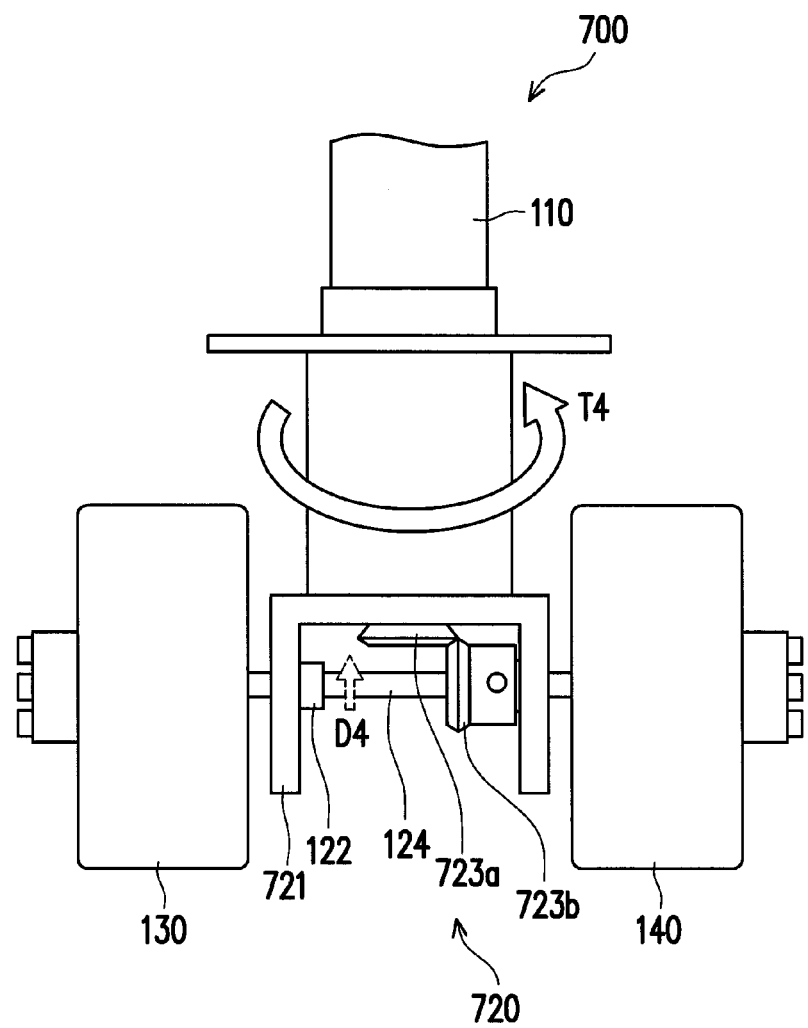

FIGS. 7A and 7B respectively show the wheel module of yet another embodiment under different conditions. Referring to FIG. 7A and FIG. 7B, in the embodiment, the wheel module 700 includes a motor 110, a transmission unit 720, a first wheel 130, and a second wheel 140. The transmission unit 720 includes a base 721, a one-way bearing 122, a transmission shaft 124 and a pair of bevel gears 723a and 723b coupled to each other. The motor 110 and the transmission shaft 124 are respectively pivoted to the base 721. The motor 110 is connected to the bevel gear 723a (and the rotation shaft of the motor 110 is coaxial with the rotation shaft of the bevel gear 723a), and the transmission shaft 124 is coaxially connected to the bevel gear 723b. Accordingly, the rotation shaft of the motor 110 is perpendicular to the transmission shaft 124, so the power outputted by the motor 110 is transmitted to the transmission shaft 124 through the pair of bevel gears 723a and 723b. The first wheel 130 and the second wheel 140 are coaxially disposed on the transmission shaft 124, and are located on the two sides of the base 721. The one-way bearing 122 is coupled between the transmission shaft 124 and the base 721, and is located away from the bevel gear 723b.

Based on the above, when the motor 110 outputs a first rotating moment T3, the motor 110 will drive the transmission shaft 124 by way of the bevel gears 723a and 723b to rotate in the third direction D3. At this point the one-way bearing 122 is in a disengaged state. Therefore, the transmission shaft 124 can simultaneously drive the first wheel 130 and the second wheel 140 to rotate in the third direction D3, allowing the wheel module 700 to have a linear motion effect. In contrast, when the motor 110 outputs a second rotating moment T4, the motor 110 will originally drive the transmission shaft 124 to rotate in a fourth direction D4. At this time the one-way bearing 122 is in an engaged state, causing the bevel gears 723a and 723b to be in a clamped state, which is to say the transmission shaft 124 is unable to rotate in the fourth direction D4. It should be noted that since the motor 110 will continue to provide the second rotating moment T4, it will cause the motor 110 to drive the base 721 with the second rotating moment T4 so that the base 721 rotates in the same direction as the second rotating moment T4. Thus, the wheel module 700 will have a turning motion effect.

Figure 8A:
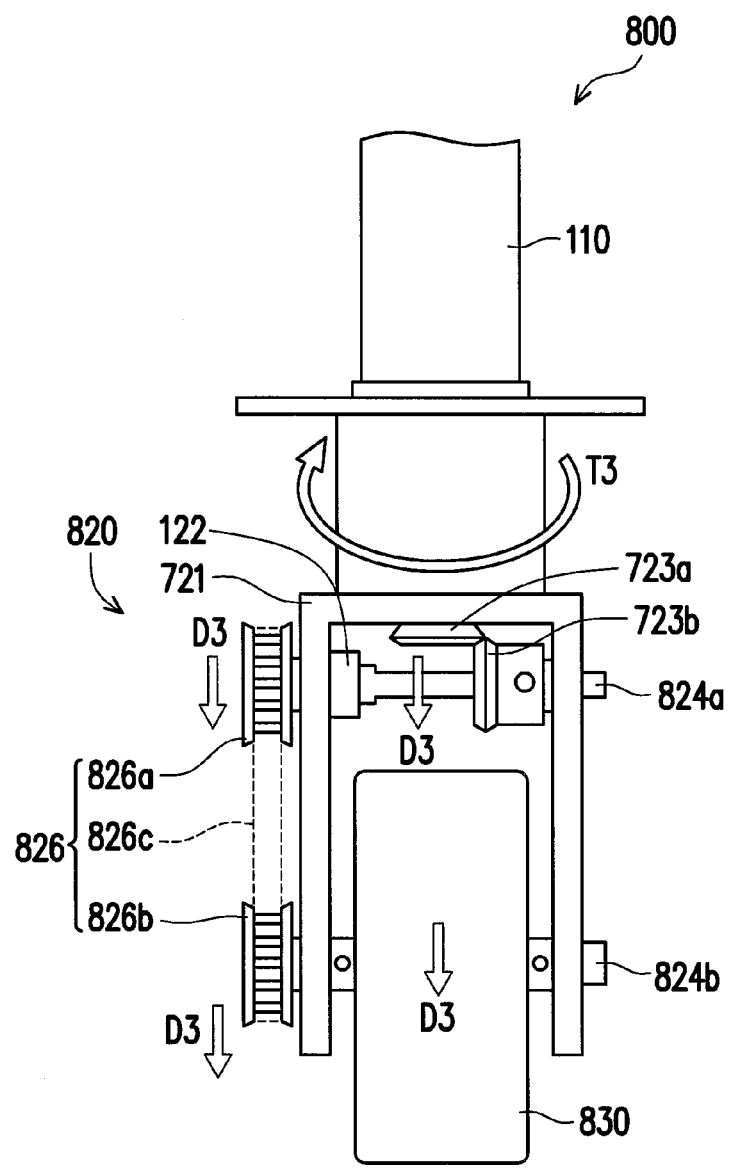
FIGS. 8A and 8B respectively show the wheel module of still another embodiment under different conditions.
Figure 8B:
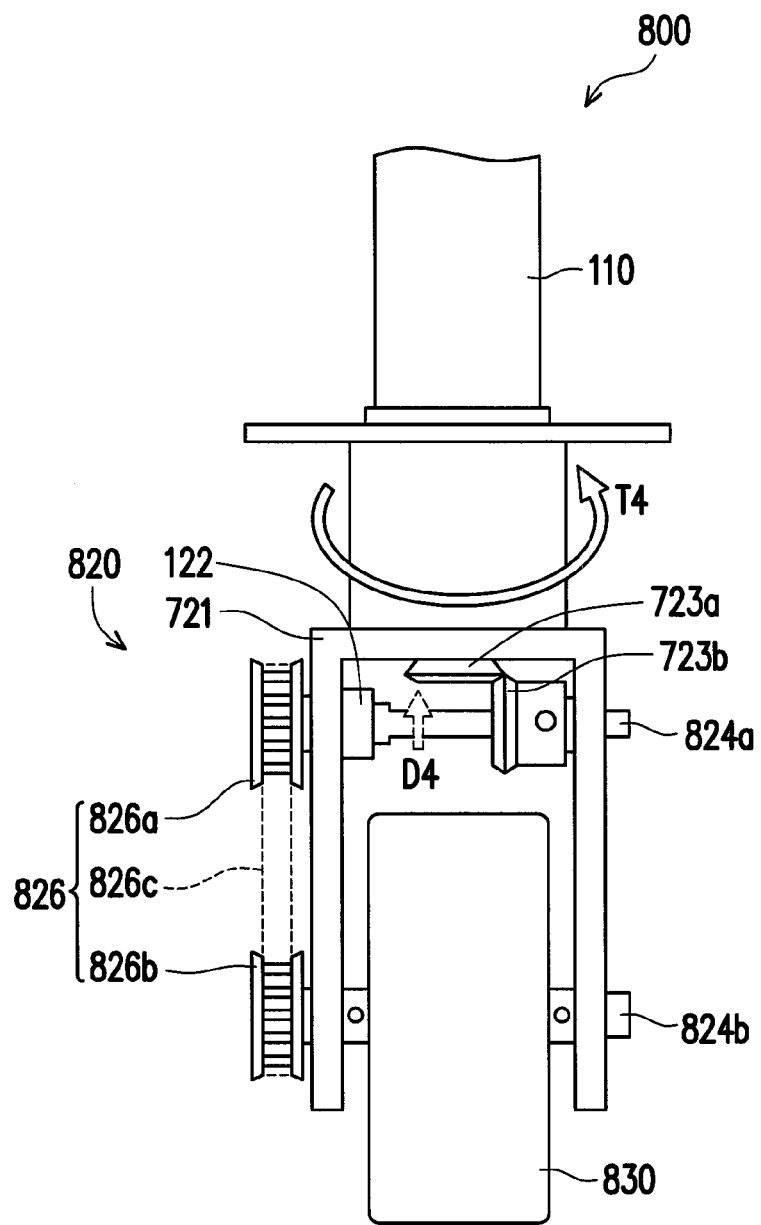
Figure 9:
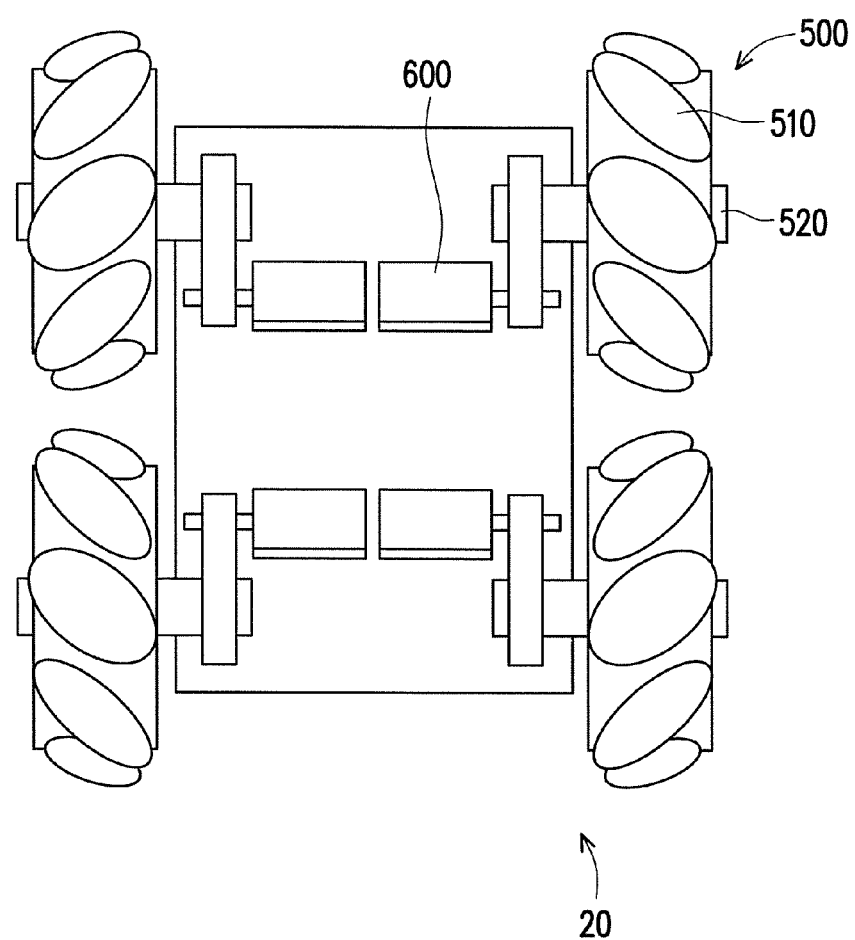
FIG. 9 shows a bottom view of a conventional wheelchair.

FIGS. 8A and 8B respectively show the wheel module of still another embodiment under different conditions. Referring to FIG. 8A and FIG. 8B, the difference between the embodiment and the embodiment of FIG. 7A and FIG. 7B, in the embodiment, the wheel module 800 includes a motor 110, a transmission unit 820, and a wheel 830. The transmission unit 820 includes a base 721, a one-way bearing 122, a first transmission shaft 824a, a second transmission shaft 824b, and a pair of bevel gears 723a and 723b coupled to each other. The motor 110 and the first transmission shaft 824a and the second transmission shaft 824b are respectively pivoted to the base 721. The motor 110 is connected to the bevel gear 723a (and the rotation shaft of the motor 110 is coaxial with the rotation shaft of the bevel gear 723a), and the first transmission shaft 824a is coaxially connected to the bevel gear 723b. The second transmission shaft 824b and the first transmission shaft 824a are disposed on the base 721 and parallel to each other, and the wheel 830 is coaxially disposed on the second transmission shaft 824b. The one-way bearing 122 is coupled between the base 721 and the first transmission shaft 824a.

In addition, the transmission unit 820 further includes a timing pulley set 826. The timing pulley set 826 includes a pair of pulleys 826a and 826b and a timing belt 826c. The pulleys 826a is coaxially connected to the first transmission shaft 824a, and the pulleys 826b is coaxially connected to the second transmission shaft 824b. The timing belt 826c is coupled to the pulleys 826a and 826b. Accordingly, when the motor 110 outputs a first rotating moment T3, the motor 110 will drive the first transmission shaft 824a and the bevel gear 723b to rotate in the third direction D3. At this point the one-way bearing 122 is in a disengaged state. Therefore, the first rotating moment T3 outputted from the motor 110 can drive the wheel 830 to roll by way of the first transmission shaft 824a, the timing pulley set 826, and the second transmission shaft 824b. This allows the wheel module 800 to have a linear motion effect. In contrast, when the motor 110 outputs a second rotating moment T4, even though the motor 110 will originally drive the bevel gear 723b and the first transmission shaft 824a to rotate in a fourth direction D4, at this time the one-way bearing 122 is in an engaged state, causing the bevel gears 723a and 723b to be in a clamped state, which is to say the first transmission shaft 824a is unable to rotate in the fourth direction D4. It should be noted that the motor 110 will continue to provide the second rotating moment T4, and will cause the motor 110 to drive the base 721 with the second rotating moment T4 so that the base 721 rotates in the same direction as the second rotating moment T4. This allows the wheel module 800 to have a turning effect. This way the wheel module of the embodiment can achieve linear motion or rotation motion with just one wheel 830 by way of the described structural configuration. Thus, a designer can use the described configuration and make suitable arrangements, so that the wheel module and the wheelchair applying the wheel module of the invention can achieve a better motion effect.

In summary, in the embodiment of the invention, one-way bearings are disposed in the wheel module to respectively control the rotating direction of the wheel, and cause the wheel module to simultaneously possess two degrees of freedom in forward motion and rotation with only a single motor. Through the harmony and coordination of the rotation angle between the wheels, the wheelchair drives the seat body to create different modes of motion such as linear motion or left, right sideways motion by of the wheel module. This allows the wheel module to effectively improve the rotating efficiency of the wheel. That is to say, the wheel does not need velocity components of multiple directions to move. This way, the power transformation and movement of the wheelchair has a better practical efficiency.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A wheel module, comprising:
   a motor;
   at least one wheel; and
   a transmission unit, coupled between the motor and the wheel, the transmission unit having at least one one-way bearing, the motor outputting a first rotating moment and a second rotating moment with opposite directions to the transmission unit, the one-way bearing transmitting one of the first rotating moment and the second rotating moment to the wheel, driving the wheel to roll, so that the wheel module is in linear motion, or so the wheel module rotates in the directions of the first or the second rotating moments, wherein the shafts of the first and the second rotating moments are perpendicular to a rotating shaft of the wheel.

2. The wheel module as claimed in claim 1, wherein the transmission unit comprises:
   at least one transmission shaft, wherein the wheel is coupled to the transmission shaft; and
   a gear set, coupled between the motor and the transmission shaft.

3. The wheel module as claimed in claim 2, wherein the at least one wheel comprises two wheels, coaxially connected to the transmission shaft, so that the motor drives the wheels to roll by the gear set and the transmission shaft, and the one-way bearing is coupled between the transmission shaft and one of the wheels.

4. The wheel module as claimed in claim 2, wherein the transmission unit also comprises:
   a base, wherein the motor and the transmission shaft are respectively pivoted on the base, the wheel is coaxially connected to the transmission shaft, and the one-way bearing is coupled between the base and the transmission shaft.

5. The wheel module as claimed in claim 4, wherein the at least one wheel comprises two wheels, respectively coupled to the transmission shaft and located at two opposite sides of the base.

6. The wheel module as claimed in claim 4, wherein the at least one transmission shaft comprises two transmission shafts coupled to each other, one of the transmission shafts is coupled to the gear set, and the other transmission shaft is coaxially coupled to the wheel.

7. The wheel module as claimed in claim 6, wherein the transmission unit also comprises:
   a pulley set, coupled between the transmission shafts.

8. The wheel module as claimed in claim 2, wherein the gear set comprises:
   a bevel gear set, wherein the motor is coaxially connected to one bevel gear of the bevel gear set, and the transmission shaft is coaxially connected to another bevel gear of the bevel gear set.

9. The wheel module as claimed in claim 2, wherein the gear set comprises:
   a spur gear set, wherein the motor is coaxially connected to one spur gear of the spur gear set;
   a worm shaft, coaxially connected to another spur gear of the spur gear set; and
   a worm gear, disposed on the transmission shaft and coupled to the worm shaft.

10. The wheel module as claimed in claim 1, wherein the at least one one-way bearing comprises a pair of one-way bearings, the at least one wheel comprises a first wheel and a second wheel, and the transmission unit comprises:
    a first gear and a second gear, coupled to the motor, one of the pair of one-way bearings being assembled to the first gear and coupled to the first wheel, the other one-way bearing being assembled to the second gear and coupled to the first wheel, wherein the first wheel, the pair of one-way bearings, the first gear, and the second gear are coaxially configured.

11. The wheel module as claimed in claim 10, wherein the transmission unit also comprises:
    a third gear, disposed on the motor and coupled between the first gear and the second gear, wherein a rotating shaft of the third gear is perpendicular to a rotating shaft of the first gear and a rotating shaft of the second gear, and the third gear drives the first gear and the second gear to rotate in opposite directions.

\* \* \* \* \*